No. 800,377. PATENTED SEPT. 26, 1905.
J. S. KURTZ.
TONGUE SUPPORT.
APPLICATION FILED SEPT. 3, 1904.
2 SHEETS—SHEET 2.
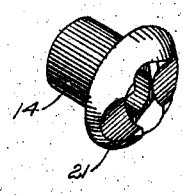
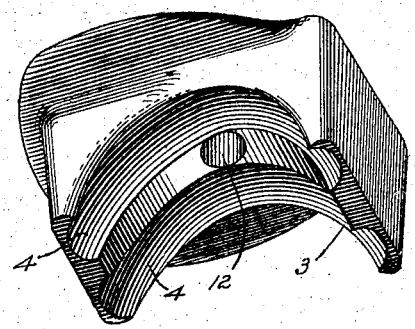
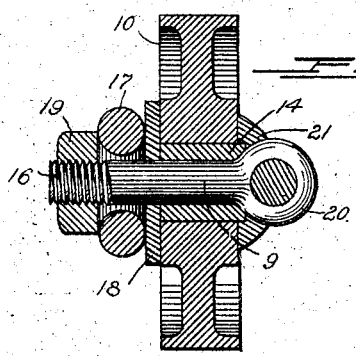
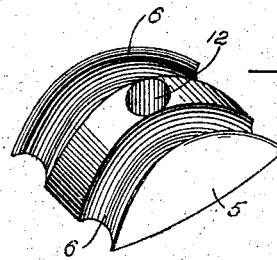
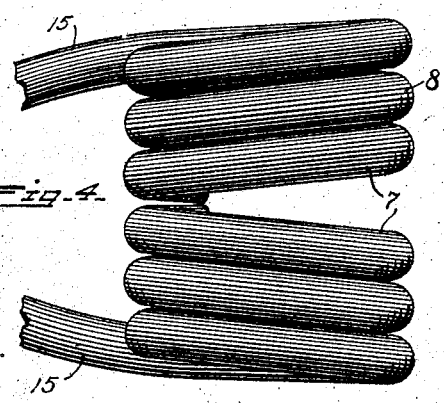
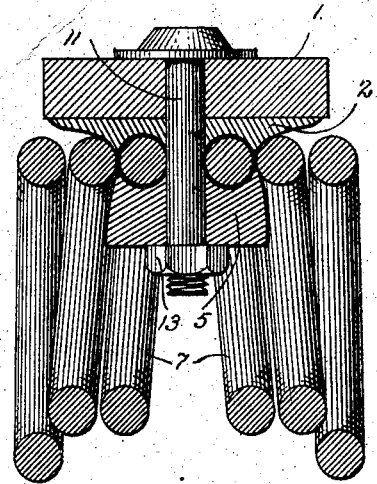
WITNESSES:
Chas. G. Hensel.
C. G. Bassler.
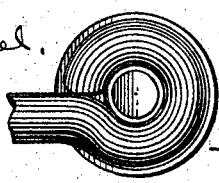
INVENTOR.
John S. Kurtz.
BY
Wm. R. Gerhart,
ATTORNEY.

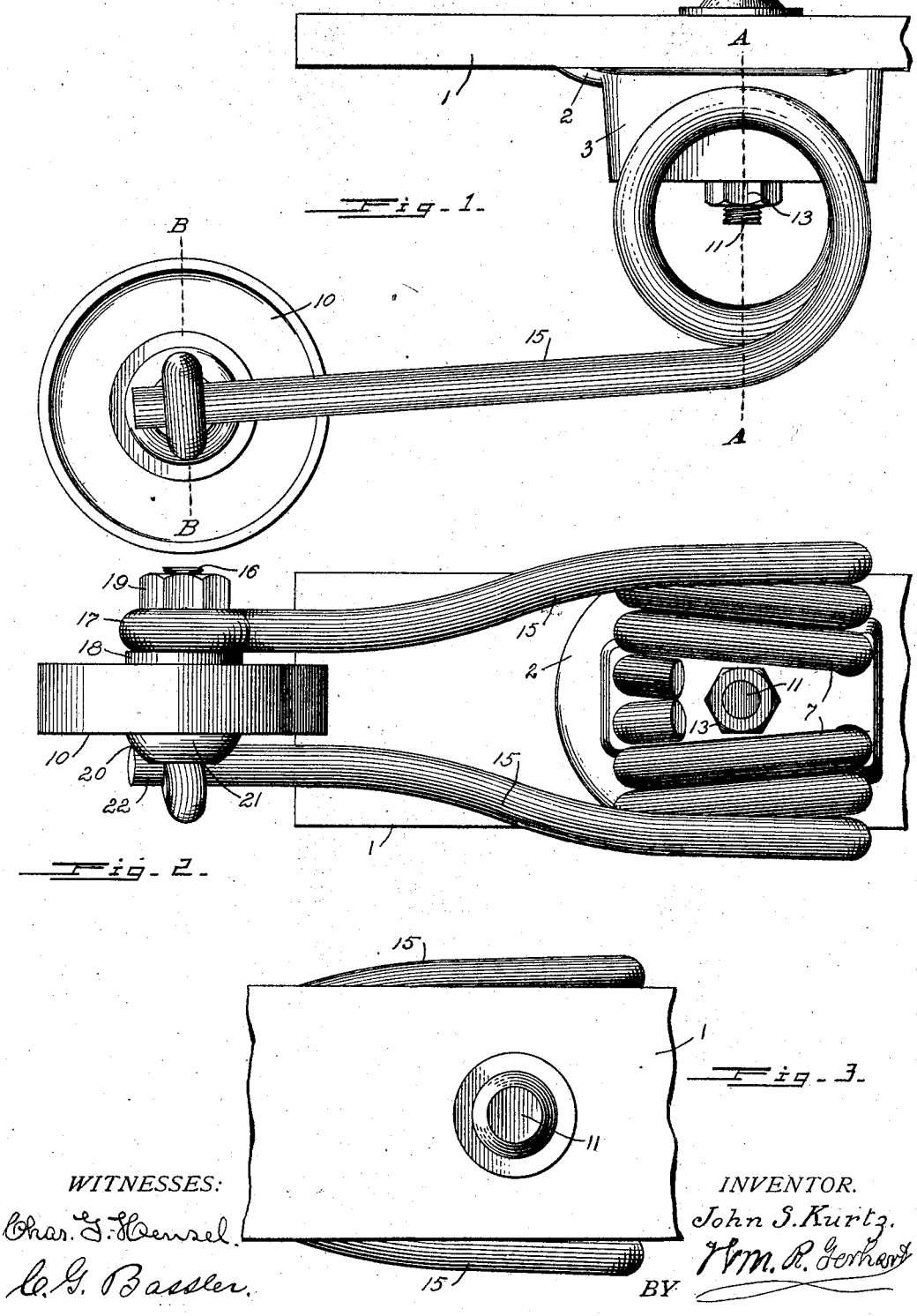

UNITED STATES PATENT OFFICE.

JOHN S. KURTZ, OF EARL TOWNSHIP, LANCASTER COUNTY, PENNSYLVANIA.

TONGUE-SUPPORT.

No. 800,377.	Specification of Letters Patent.	Patented Sept. 26, 1905.

Application filed September 3, 1904. Serial No. 223,296.

*To all whom it may concern:*

Be it known that I, JOHN S. KURTZ, a citizen of the United States, residing in Earl township, in the county of Lancaster and State of Pennsylvania, have invented certain new and useful Improvements in Tongue-Supports, of which the following is a specification, reference being had therein to the accompanying drawings.

This invention relates to a support for the tongues of agricultural machines; and its object is to provide a simple, compact, and efficient construction and arrangement of parts adapted for yieldingly attaching a rolling support or colter-wheel to the tongue of an agricultural or equivalent machine and whereby the angle of the spring-arm in relation to the tongue can be easily and rapidly varied.

The invention consists, first, in the construction of the end of the spring adjacent to the tongue; second, in the connection between the spring and the tongue; third, in the construction of the mechanism for regulating the angle between the spring-arm and the tongue, and, fourth, in the construction and combination of the various parts, as hereinafter fully described and then pointed out in the claims.

In the accompanying drawings, forming a part of this specification, Figure 1 is a side elevation; Fig. 2, a bottom plan view; Fig. 3, a top view of the whole invention; Fig. 4, a top view of the spring detached; Fig. 5, a vertical section through A A of Fig. 1; Fig. 6, a perspective bottom view of the spring-head; Fig. 7, a perspective top view of the spring-head clamp; Fig. 8, a transverse section through the colter-wheel and its connections; Fig. 9, a perspective view of the bushing of the colter-wheel, and Fig. 10 a side view of the connection between one of the spring-arms and the spindle of the colter-wheel.

Referring to the details of the drawings, 1 indicates the tongue, resting upon the bearing-plate 2 of the spring-head.

3 indicates the spring-head, the under face whereof is concave in outline longitudinally of the length of the tongue, and in the face of this concavity there are grooves 4, also disposed longitudinally of said tongue and of the same convexity as the spring-head. There is a convex clamp 5 adapted to engage the concavity of spring-head 3 and having therein convex grooves 6, adapted to range with grooves 4 of the spring-head. The groove 4 on each side of spring-head 3 is engaged by the inner fake 7 of the spring-wire, the other fakes being outside of said spring-head. The outer fake of each spring-coil extends forward and forms a spring-arm 15, supporting one end of the spindle 9 of the colter-wheel 10. The grooves 6 of clamp 5 also engage the fakes 7 of coils 8. These parts are bound together by a bolt 11, passing through holes 12 in the tongue, the spring-head, and the clamp and secured below by a nut 13.

In operation to vary the angle of the spring-arms in relation to the tongue the nut 13 of bolt 11 is loosened, and the coils 8 are then turned in the grooves of spring-head 3 and clamp 5, after which the nut is tightened up.

The colter-wheel has passing therethrough a bushing 14, and through the bushing passes the spindle 9, supported at each end by one of the spring-arms 15. Spindle 9 is of the nature of a bolt, the end 16 thereof being threaded. On this threaded end the eye 17 of the adjacent spring-arm is separated from the colter-wheel by a washer 18, and outside of said eye is the nut 19. On the other end of the bolt is an eye 20, between which and said colter-wheel is located a grooved washer 21. The straight end 22 of one of the spring-arms passes through the groove of washer 21 and said eye 20, all as shown. End 22 of its spring-arm is secured in place by tightening nut 19.

I do not restrict myself to the details of construction herein shown and described, as it is obvious that alterations may be made therein without departing from the principle and scope of my invention.

Having thus described my invention, what I claim as new, and desire to secure by Letters Patent, is—

1. The combination, in a tongue-support, of the tongue, a spring-arm connected with a colter-wheel, and a coiled spring connecting the spring with the tongue.

2. The combination, in a tongue-support, of a tongue, a spring-head attached to the tongue, a clamp, a spring-arm connected with a colter-wheel, and a coiled spring on an end of the spring-arm and engaged between the spring-head and the clamp.

3. The combination, in a tongue-support, of a tongue, a grooved spring-head attached to the tongue, a grooved clamp, a spring-arm connected with a colter-wheel, and a coiled spring on an end of the spring-arm and engaging grooves in the spring-head and the clamp.

4. The combination, in a tongue-support, of a tongue, a grooved spring-head attached to the tongue, a grooved clamp, a spring-arm connected with a colter-wheel, and a coiled spring on an end of the spring-arm and having one fake thereof engaging a groove in the spring-head and a groove in the clamp.

5. The combination, in a tongue-support, of a tongue, a spring-head having a concave under face with a groove therein, a convex clamp having a groove in the convex face, a spring-arm connected with a colter-wheel, and a coiled spring on an end of the spring-arm and having a fake thereof engaging the grooves in the spring-head and the clamp.

6. The combination, in a tongue-support, of a tongue, a spring-head having a groove on each side thereof, a clamp having corresponding grooves, two spring-arms connected with a colter-wheel and a coiled spring on an end of each spring-arm, each of said coiled springs engaging grooves on one side of the spring-head and of the clamp.

7. The combination, in a tongue-support, of a tongue, a spring-head having a concave inner face with a groove on each side thereof, a convex clamp having a groove on each side thereof, two spring-arms connected with a colter-wheel, a coiled spring on an end of each spring-arm, each of said coiled springs engaging the grooves on one side of the spring-head and of the clamp.

8. The combination, in a tongue-support, of a tongue, a colter-wheel and two spring-arms connecting the tongue with the colter-wheel, the connection between the spring-arms and the colter-wheel comprising a bushing through the wheel and a spindle passing through the bushing, the spring-arms being fastened to the ends thereof.

JOHN S. KURTZ.

Witnesses:
C. G. BASSLER,
WM. R. GERHART.